United States Patent [19]

Knight et al.

[11] Patent Number: 4,626,299

[45] Date of Patent: Dec. 2, 1986

[54] METHOD OF ATTACHING GUIDEWAYS TO A MACHINE TOOL BED

[75] Inventors: Edwin L. Knight, Ware; William S. Shea, Clinton, both of Mass.

[73] Assignee: The Warner & Swasey Company, Cleveland, Ohio

[21] Appl. No.: 748,091

[22] Filed: Jun. 24, 1985

[51] Int. Cl.$^4$ .................... E04B 2/00; E04F 13/00
[52] U.S. Cl. .................... 156/71; 29/460; 29/526 R; 29/281.5; 82/32; 249/88; 264/251; 264/261; 156/92; 384/39; 384/42; 425/110
[58] Field of Search ............... 29/460, 526 R, 281.1, 29/281.5; 384/39, 40, 26, 42; 248/666, 659, 679; 264/261, 251; 249/88; 82/32; 156/292, 92, 91

[56] References Cited

U.S. PATENT DOCUMENTS

| | | | |
|---|---|---|---|
| 2,593,230 | 4/1952 | Walter | 384/39 |
| 2,648,573 | 8/1953 | Wheildon, Jr. | 384/42 |
| 2,675,276 | 4/1954 | Daugherty | 384/42 |
| 3,178,240 | 4/1965 | Davidson | 384/42 |
| 3,190,041 | 6/1965 | Kimball | 248/679 |
| 3,199,386 | 8/1965 | Deflandre | 82/32 |
| 3,311,425 | 3/1967 | Schraub | 384/42 |
| 3,586,395 | 6/1971 | Weaver | 82/32 X |
| 3,800,636 | 4/1974 | Zagar | 82/32 |
| 3,837,245 | 9/1974 | Schuler et al. | 82/32 |
| 3,852,979 | 12/1974 | Muhlhausler | 66/19 |
| 4,010,051 | 3/1977 | Ingrey et al. | 156/71 |
| 4,100,714 | 7/1978 | Randall | 29/460 X |

FOREIGN PATENT DOCUMENTS

| | | | |
|---|---|---|---|
| 236173 | 10/1964 | Austria | 384/42 |
| 2282085 | 3/1976 | France | 248/679 |
| 1125823 | 9/1968 | United Kingdom . | |
| 206250 | 7/1968 | U.S.S.R. | 384/42 |

Primary Examiner—Charlie T. Moon
Attorney, Agent, or Firm—Raymond J. Eifler

[57] ABSTRACT

A fixture (50) is used to precisely locate the horizontal (20, 30) and vertical (10) guideways on the bed (40) of a grinding machine. After locating the guideways (10, 20, 30), a bonding material (70) is placed in the spaces (1, 2, 3) between the guideways (10, 20, 30) and grinding machine bed (40). After the fixture (50) is removed, bolts (80) are tightened to apply a compressive force on the bonding material (70) located between the vertical guideway (10) and the machine tool bed (40).

6 Claims, 5 Drawing Figures

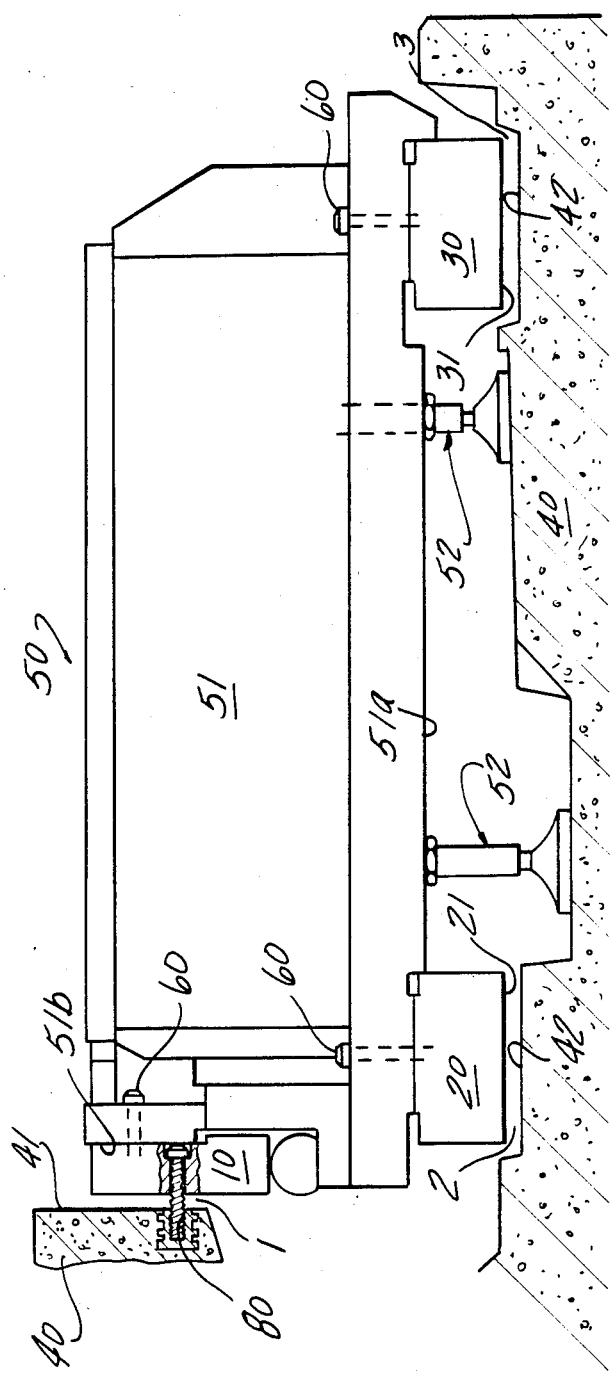
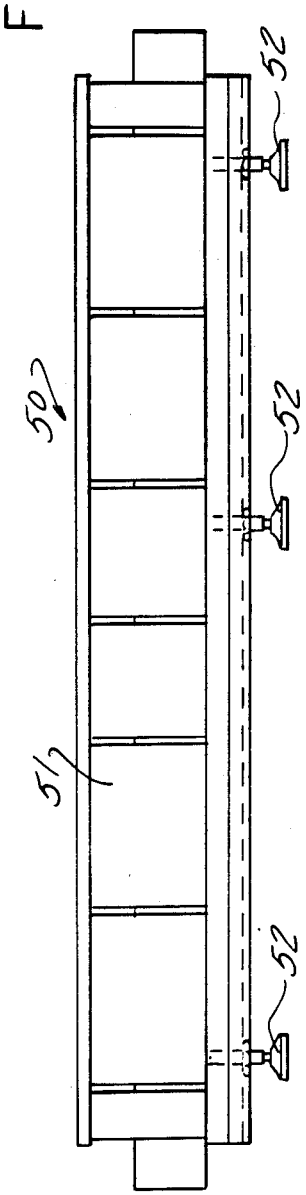
FIG-1
FIG-2

METHOD OF ATTACHING GUIDEWAYS TO A MACHINE TOOL BED

This invention relates to machine tools and more specifically to the assembly of guideways onto a bed of a grinding machine.

Machine tools generally include a base or bed, one or more guideways on the bed and a carriage mounted for movement along the guideways. Attached to the carriage would be one or more tools for cutting, shaping or grinding a workpiece mounted on a work table. In a grinding machine, a carriage holding a grinding wheel is supported in two planes by three guideways. One of the guideways is located in a vertical plane on the machine tool bed. The other two guideways are located in a horizontal plane on the machine tool bed. Bearing surfaces, attached to the carriage, engage these guideways and allow the carriage to move back and forth along the guideways. To precisely machine or grind a workpiece it is necessary that all the guideways be exactly positioned relative to each other. One way of accomplishing this precise positioning is to precision machine the guideways into the base of the machine tool. This precision machining to precisely locate the guideways is a very expensive manufacturing operation. One example of a grinding machine having guideways may be found in U.S. Pat. No. 4,205,488, issued June 3, 1980 and entitled "Grinding Machine".

DISCLOSURE OF THE INVENTION

This invention eliminates the need to precision machine the guideways into the bed of a machine tool. The invention is characterized by a method of precisely locating and mounting separately manufactured guideways onto the bed of a machine tool and by a fixture that precisely orients the guideways with respect to each other and holds them in a fixed relationship to the bed of the machine tool so that they can be bonded to the bed.

Accordingly, it is an advantage of this invention to provide a method of precisely locating guideways with respect to each other and the bed of a grinding machine.

Another advantage of this invention is to eliminate the need to precision machine guideways into the bed of a grinding machine to obtain a predetermined relationship between guideways.

Another advantage of this invention is to decrease the cost of assembling a machine tool that includes guideways.

DETAILED DESCRIPTION OF THE INVENTION

FIGS. 1, 2 and 3 illustrate views of a fixture for precisely orienting guideways with respect to each other and onto a bed of a machine tool.

Figure 3:
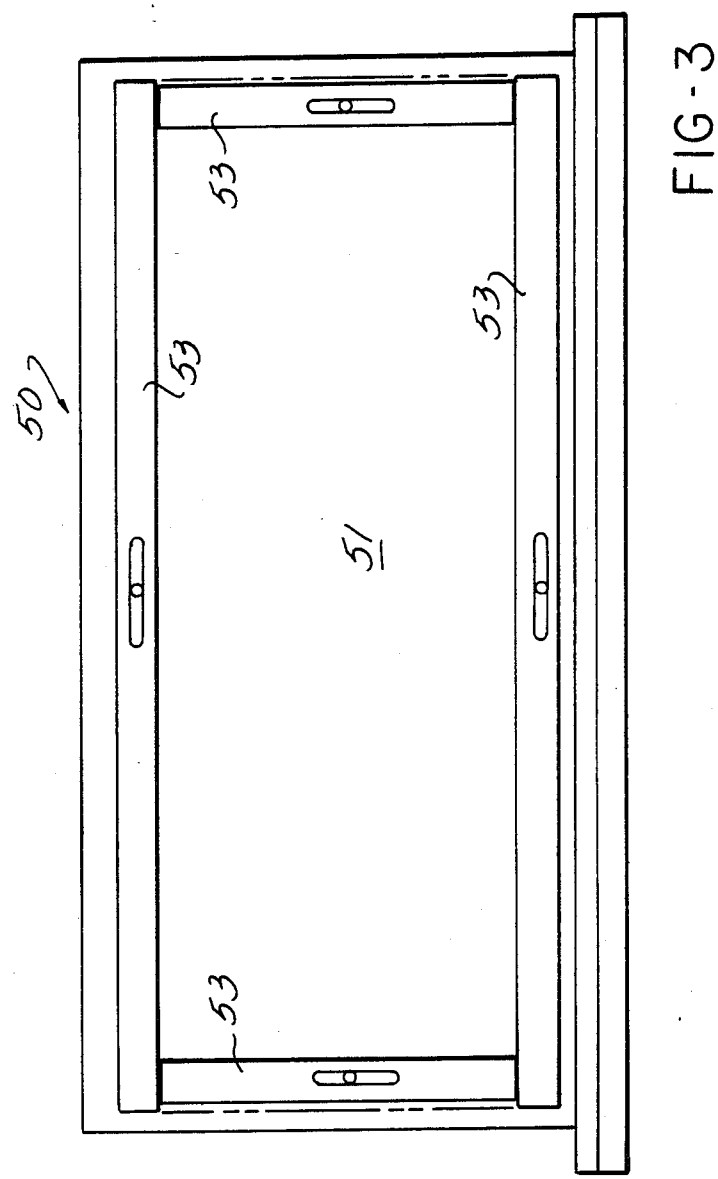

Referring now to the drawings, FIG. 1 illustrates the fixture 50 which comprises a frame 51 having a bottom portion 51a, a side portion 51b, and a plurality of adjustable legs 52 mounted to the bottom portion 51a of the frame 51. Each of the legs 52 includes a threaded shaft so that adjustment of a nut will shorten and lengthen the height of a leg 52. Threaded bolts 60 releasably attach a vertical guideway 10 to the side portion 51b of the frame 51 and two horizontal guideways 20 and 30 to the bottom portion 51a of the frame 51. The legs 52 of the fixture 50 are adjustable to position the lower surfaces 21, 31 of the horizontal guideways 20, 30 in spaced relationship to the machine tool bed 40. The spaces 1, 2, 3 between the guideways 10, 20, 30 and the machine tool bed 40 are for receiving a material to bond the guideways 10, 20, 30 to the bed 40. To increase the shear strength of the guideway 10, in the vertical plane, after it is bonded to the base 40, a plurality of bolts 80, located along a horizontal axis, extend through the guideway 10 and screw into the machine tool bed 40. Additionally, shear pins may be used. The fixture 50 is fabricated with great precision and care so that it can be used repeatedly and quickly to precisely locate and mount guideways 10, 20, 30 in a predetermined relationship to each other on the bed 40 of a machine tool. The fixture 50 may, of course, be used to locate one, two or three guideways.

FIG. 2 is a rear view of the fixture 50 that illustrates that there are three adjustable legs 52 to adjust the level of the frame 51 and hence the guideways 10, 20, 30 attached to the frame 51.

FIG. 3 is a top view of the fixture 50 that illustrates the location of leveling devices 53, which are used in conjunction with the legs (52, FIGS. 1 and 2) to locate the frame 51 and hence the guideways in a predetermined spaced relationship to the bed.

Figure 4:
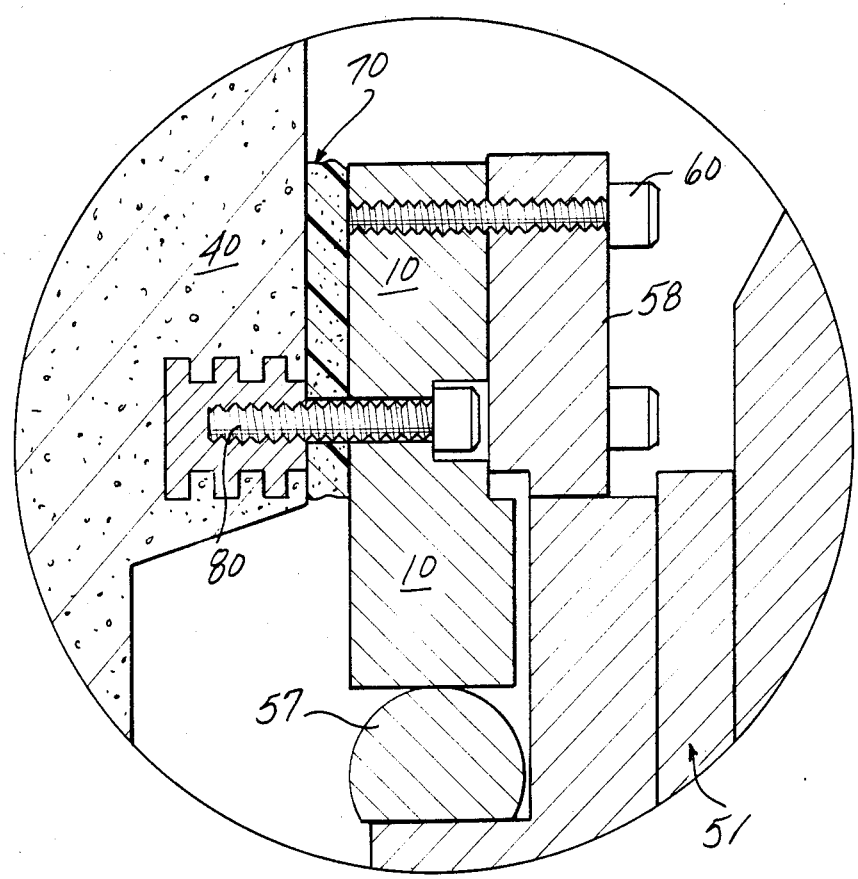
FIGS. 4 and 5 illustrate the guideways bonded to the machine tool base.

FIG. 4 is an enlarged view of the guideway 10, located in the vertical plane, bonded to the machine tool bed 40. The bond 70 is accomplished with a structural adhesive or an epoxy such as Sikadur 42 (made by Sika Corporation) located in the space between the bed 40 and the guideway 10. To contain the adhesive or epoxy in this space before it hardens a barrier, such as clay (not shown), is used to form a wall between the bed 40 and guideway 10. Preferably, the spacing between the guideway 10 and the machine tool bed 40 is approximately 1.0 centimeter (0.39 inches). To precisely orient the guideway 10 in relation to the other guideways, the frame 51 includes two precisely machined locating members 57, 58, against which the guideway 10 is releasably secured by one or more bolts 60. By tightening the bolts 80 after the bonding material has hardened, a compressive force is applied to the bonding material 70 which, increases the shear strength of the bond. Similarly, bolts may be used to increase the shear strength of the bond for the horizontal guideways 20, 30.

Figure 5:
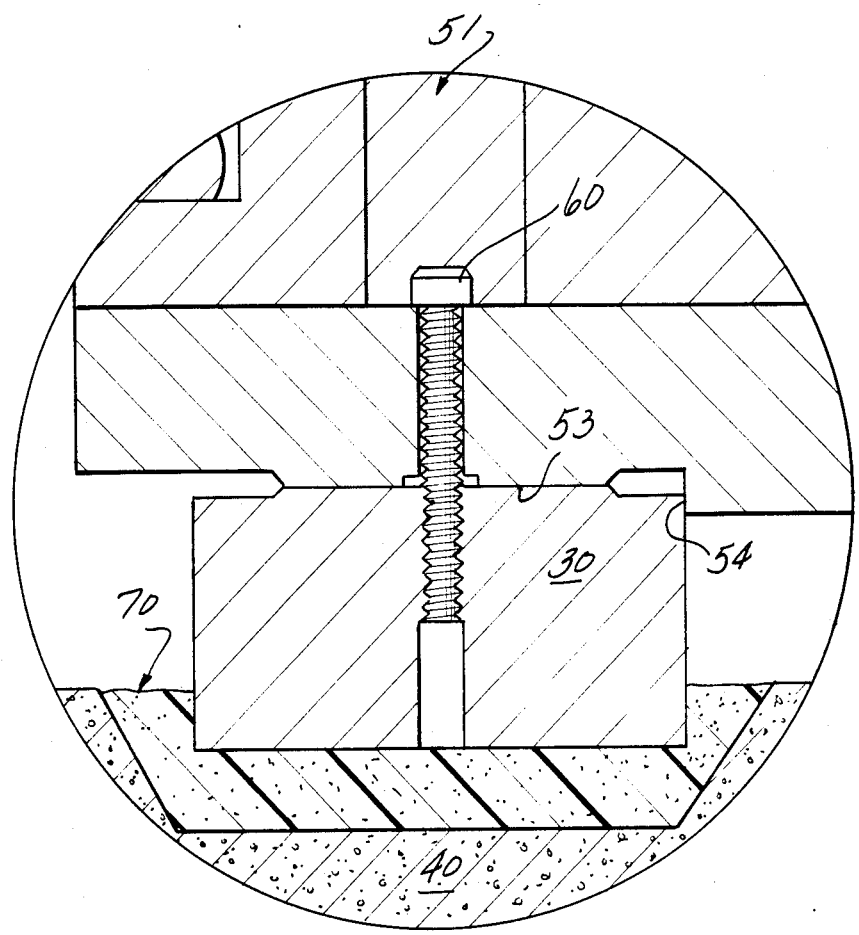

FIG. 5 illustrates one of the guideways 30 in the horizontal plane bonded to the machine tool bed 40. Precisely machined surfaces 53 and 54 of the frame 51 locate the horizontal guideway 30 in precise relationship to the frame 51 and to the other guideways. Similar surfaces precisely locate the remaining horizontal guideway.

METHOD

The method of attaching guideways 10, 20 and 30 to a machine tool bed 40 is accomplished as follows:

bolts 80 are attached to the vertical guideway 10;

guideways 10, 20, 30 are releasably attached by bolts 60 to the frame 51 of the fixture 50;

the fixture 50 is then located in a predetermined position on the bed 40 of a machine tool;

the length of the legs 52 are adjusted to locate the horizontal guideways 20, 30 in a predetermined spaced relationship to the machine tool bed 40 to provide a space 2, 3 for a bonding material 70;

the frame 51 is also located so that the vertical guideway 10 is also located in a predetermined spaced relationship to the bed 40 to provide a space 1 for a bonding material 70;

clay or another barrier is arranged to confine the space 1 between the vertical guideway 10 and the machine tool bed 40;

a bonding material 70 is poured into the spaces 1, 2, 3 between the guideways 10, 20, 30 and the machine tool bed 40 and allowed to cure and harden;

the bolts 60 retaining the guideways to the frame 51 are removed allowing the fixture 50 to be removed leaving the guideways 10, 20, 30 firmly bonded to the machine tool bed 40; and the bolts 80 in the vertical guideway 10 are tightened to apply a compressive force to the bonding material 70 between the vertical guideway 10 and the bed 40.

We claim:

1. A method of attaching guideways (10, 20, 30) to a machine tool bed (40), comprising the steps of:

attaching a plurality of guideways (10, 20, 30) to a fixture (50) to hold said guideways in a predetermined spaced relationship;

locating the fixture (50) in a predetermined relationship to said bed (40) so that there is a respective space (1, 2, 3) between each of said guideways (10, 20, 30) and said bed (40);

filling the space (1, 2, 3) between said guideways (10, 20, 30) and said bed with a bonding material (70);

allowing the bonding material (70) to harden to bond each of said guideways (10, 20, 30) to said bed (40) and;

removing the fixture (50) from the guideways (10, 20, 30).

2. The method as described in claim 1 including:

attaching a plurality of bolts (80) to one of the bed (40) and at least one vertical guideway (10), said bolts (80) adapted to extend into respective threaded passages in the other of said bed and said guideway when said fixture (50) is located in a predetermined relationship to said bed (40).

3. The method as described in claim 2 including:

locating said bolts (80) and said passages along a horizontal axis; and, after the bonding material (70) has hardened, tightening said bolts (80) into said passages to apply a compressive force to the hardened bonding material (70) between said one guideway (10) and said bed (40).

4. The method as described in claim 1 wherein the bed includes two surfaces (41, 42) in planes generally perpendicular to each other and wherein one guideway (10) attached to the fixture (50) is in a plane perpendicular to another guideway (20) attached to the fixture (50) so that when the fixture (50) is located in said predetermined spaced relationship to said base (40), each of said guideways (10, 20) in perpendicular planes is located in a predetermined spaced relationship to a respective surface (41, 42) of said bed (40).

5. The method as described in claim 2 wherein the bed includes two surfaces (41, 42) in planes generally perpendicular to each other and wherein one guideway (10) attached to the fixture (50) is in a plane perpendicular to another guideway (20) attached to the fixture (50) so that when the fixture (50) is located in said predetermined spaced relationship to said base (40), each of said guideways (10, 20) in perpendicular planes is located in a predetermined spaced relationship to a respective surface (41, 42) of said bed (40).

6. The method as described in claim 3 wherein the bed includes two surfaces (41, 42) in planes generally perpendicular to each other and wherein one guideway (10) attached to the fixture (50) is in a plane perpendicular to another guideway (20) attached to the fixture (50) so that when the fixture (50) is located in said predetermined spaced relationship to said base (40), each of said guideways (10, 20) in perpendicular planes is located in a predetermined spaced relationship to a respective surface (41, 42) of said bed (40).

* * * * *